No. 628,944. Patented July 18, 1899.
A. KHOLODKOWSKY.
ACTUATING APPARATUS FOR RAILWAY BRAKES.
(Application filed Feb. 26, 1898.)

(No Model.) 2 Sheets—Sheet 1.

Witnesses Inventor
Andre Kholodkowsky

No. 628,944.  
A. KHOLODKOWSKY.  
ACTUATING APPARATUS FOR RAILWAY BRAKES  
(Application filed Feb. 26, 1898.)

(No Model.)

Patented July 18, 1899.

2 Sheets—Sheet 2.

Witnesses

Inventor

UNITED STATES PATENT OFFICE.

ANDRE KHOLODKOWSKY, OF KICHINEFF, RUSSIA.

ACTUATING APPARATUS FOR RAILWAY-BRAKES.

SPECIFICATION forming part of Letters Patent No. 628,944, dated July 18, 1899.

Application filed February 26, 1898. Serial No. 671,875. (No model.)

*To all whom it may concern:*

Be it known that I, ANDRE KHOLODKOW-SKY, a subject of the Czar of Russia, residing at Kichineff, Russia, have invented certain new and useful Improvements in Railway-Brakes, of which the following is a full, clear, and exact description.

This invention relates to apparatus for effecting the automatic operation of the brakes of a train in the case of derailment or an accident of any kind happening to the rolling-stock.

It has for its object the production of an apparatus of easy regulation that will "register" or "record," so to speak, simultaneously the abnormal movements of the axles of a vehicle and the abnormal displacements of the body of the vehicle. According thereto there is secured to the collar of one or more of the springs of a vehicle a bent bar furnished with impact bolts or plates that participate in the movements of the spring, and between these impact bolts or plates there is arranged a valve that participates in the movements of the body of the vehicle, the arrangement being such that any abnormal displacement either of the axle or of the body of the vehicle will result in effecting the automatic opening of the valve, and consequently the automatic operation of the brakes of the train.

In the accompanying drawings is represented by way of example a vehicle-axle furnished with apparatus in accordance with this invention.

Figure 1:
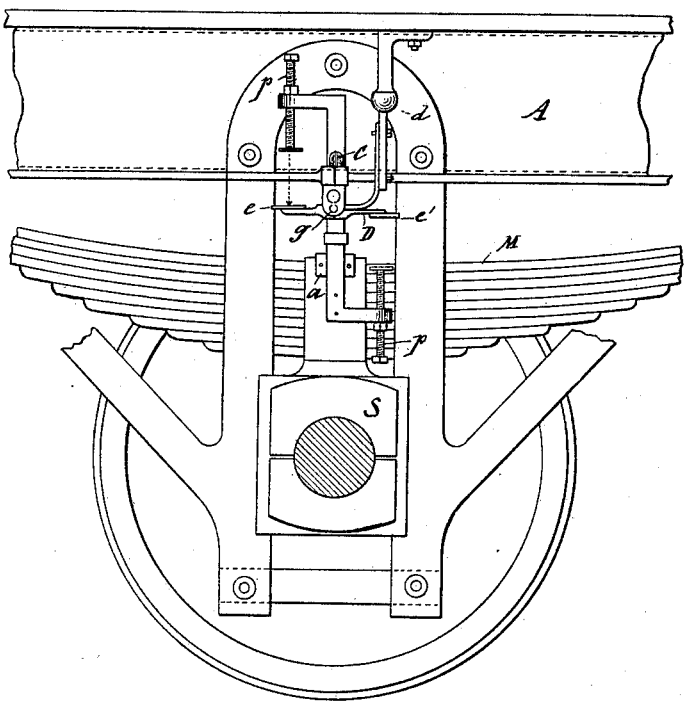
Figure 3:
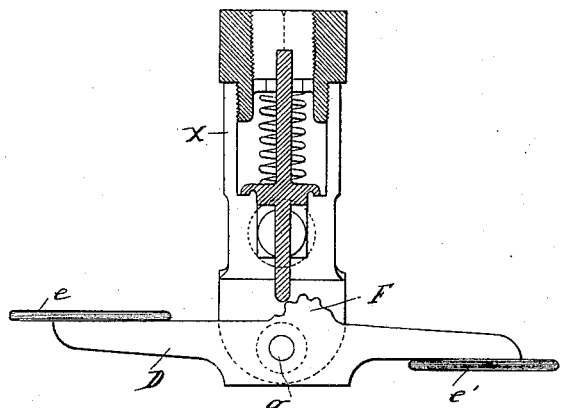
Figure 2:
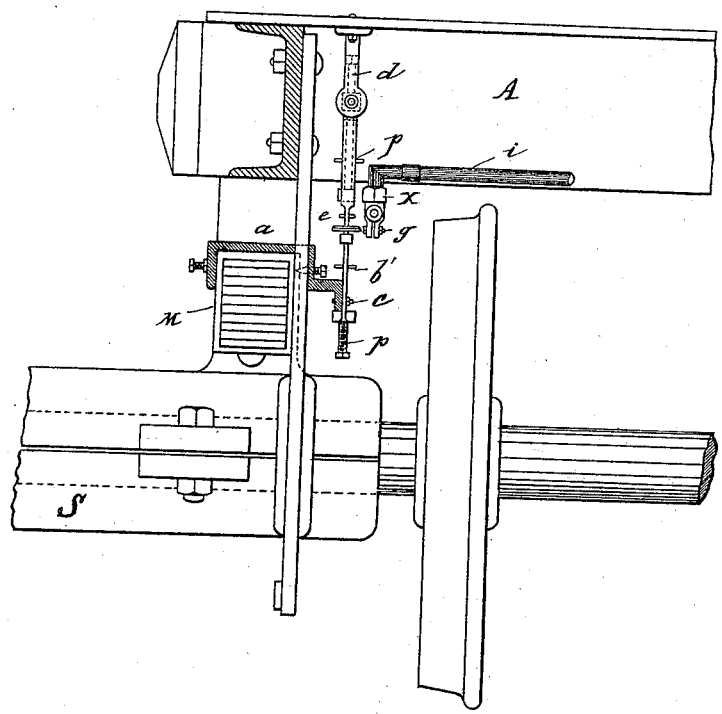

Figures 1 and 2 show, respectively, a front elevation and an end view of the invention. Fig. 3 is a separate view of the arrangement for controlling the valve. This arrangement comprises a bent bar C, fixed by means of a support or bracket $a$ to the collar of one of the springs M of the vehicle, which rests upon the axle-bearing S. The bar is secured to the support or bracket by means of nuts, so as to be adjustable therein. This bar C has two horizontal arms, which project in opposite directions from its ends and in which are mounted two vertical bolts $p\ p'$ of adjustable length, whose heads form two impact plates or knobs arranged opposite to each other. Between these plates there is mounted on an axle $g$, carried by a support or bracket $d$, fixed to the frame A of the vehicle, a lever D, carrying at its ends plates $e\ e'$, corresponding to the plates of the bent bar C. This lever D, which can oscillate on its axle $g$, controls, by a toothed or corrugated cam or eccentric portion F, Fig. 3, with which it is furnished, the opening of a valve X, whose casing is fixed on the prolongation of the said axle $g$ and is connected by a pipe $i$, Fig. 2, with the main pipe or passage for controlling the brakes. When in its normal position, the said lever D is midway between the two impact-knobs $p\ p'$ of the bent bar C. As long as the lever D occupies its normal position the valve X will be kept closed; but in the case of an abnormal compression of the vehicle-spring or of an abnormal movement of the body of the vehicle one of the plates $e\ e'$ of the lever D will strike against the corresponding impact-knob of the bent bar C. From this will result an angular displacement of the lever D, and consequently the opening of the valve X under the action of the said toothed cam or eccentric portion, which will afterward keep the valve X open. Likewise in the case of a tire rupture, a derailment, &c., the other plate of the lever will strike against the corresponding plate of the bent bar, which will again bring about an angular displacement of the lever D in the same sense as before, and consequently the opening of the valve X. It will therefore be seen that the apparatus will operate with certainty in all cases and that if the regulation be sufficiently exact the apparatus will be capable of registering or recording every compression or extension of the springs exceeding a given limit.

Apparatus of the kind described may be applied in general to all the axles of a vehicle, although good results are obtained when in the case of a vehicle having three axles only the middle axle is provided with such an apparatus or in the case of a vehicle with two axles when one such apparatus is placed at one end of one of the axles and another is placed at the opposite end of the other axle.

What I claim is—

In an apparatus for effecting the automatic operation of the brakes of a train, in combination a bent bar secured to the collar of the springs of a railway-vehicle, impact bolts or knobs adjustable to said bent bar, an oscillating lever mounted on an axle adapted to a support fixed to the frame of the vehicle, a toothed cam fixed on said oscillating lever and a valve adapted to actuate the brakes and controlled by said toothed cam, substantially as described.

In witness whereof I subscribe my signature in presence of two witnesses.

ANDRE KHOLODKOWSKY.

Witnesses:
　THOMAS E. HEENAN,
　THOMAS MILES.